(12) United States Patent
Cinelli et al.

(10) Patent No.: US 12,500,952 B2
(45) Date of Patent: Dec. 16, 2025

(54) METHOD TO SUBDIVIDE, DISTRIBUTE AND STORE DATA ASSOCIATED WITH A SUBJECT IN A PLURALITY OF DISTRIBUTED MEMORIES OF A TELECOMMUNICATIONS NETWORK AND RELATED ELECTRONIC SYSTEM FOR THE SUBDIVISION, DISTRIBUTION AND STORAGE OF THE DATA

(71) Applicant: FRAGMENTALIS S.R.L., Milan (IT)

(72) Inventors: Andrea Cinelli, Milan (IT); Alessandro Redaelli, Milan (IT)

(73) Assignee: FRAGMENTALIS S.R.L., Milan (IT)

( * ) Notice: Subject to any disclaimer, the term of this patent is extended or adjusted under 35 U.S.C. 154(b) by 11 days.

(21) Appl. No.: 18/717,795

(22) PCT Filed: Dec. 6, 2022

(86) PCT No.: PCT/IB2022/061816
§ 371 (c)(1),
(2) Date: Jun. 7, 2024

(87) PCT Pub. No.: WO2023/105403
PCT Pub. Date: Jun. 15, 2023

(65) Prior Publication Data
US 2025/0030762 A1 Jan. 23, 2025

(30) Foreign Application Priority Data
Dec. 10, 2021 (IT) .................. 102021000031022

(51) Int. Cl.
*H04L 12/24* (2006.01)
*H04L 41/0803* (2022.01)
(Continued)

(52) U.S. Cl.
CPC .......... *H04L 67/1097* (2013.01); *H04L 67/56* (2022.05)

(58) Field of Classification Search
CPC ..... H04L 67/1097; H04L 67/56; H04L 9/085; H04L 9/40; H04L 63/04; H04L 63/0861; G06F 21/32
(Continued)

(56) References Cited

U.S. PATENT DOCUMENTS

2005/0165972 A1* 7/2005 Miyata ................ H04L 67/1097
710/1
2006/0149836 A1* 7/2006 Robertson ........... H04L 67/1089
709/224
(Continued)

FOREIGN PATENT DOCUMENTS

WO 2020/163865 A1 8/2020
WO WO-2021101632 A1 * 5/2021 ....... G06Q 20/38215
(Continued)

OTHER PUBLICATIONS

International Search Report and Written Opinion, mailed Mar. 3, 2023, from PCT/IB2022/061816, 12 pages.
(Continued)

*Primary Examiner* — Ario Etienne
*Assistant Examiner* — Elizabeth Kassa
(74) *Attorney, Agent, or Firm* — Workman Nydegger

(57) ABSTRACT

A method and a system for subdividing, distributing and storing data associated with a subject in a plurality of distributed memories of a telecommunications network. The system includes a telecommunications network that includes a plurality of network nodes with decentralized architecture. At least one server component connected to the telecommunications network includes a plurality of fragment storage nodes connected to the telecommunications network.
(Continued)

Each fragment storage node includes at least one respective non-volatile memory configured to store at least part of a plurality of portions of the data.

19 Claims, 6 Drawing Sheets

(51) Int. Cl.
*H04L 67/1097* (2022.01)
*H04L 67/56* (2022.01)

(58) Field of Classification Search
USPC .......................................................... 709/203
See application file for complete search history.

(56) References Cited

U.S. PATENT DOCUMENTS

| | | | | |
|---|---|---|---|---|
| 2011/0264717 | A1* | 10/2011 | Grube | G06F 11/0763 |
| | | | | 707/827 |
| 2011/0264989 | A1* | 10/2011 | Resch | H04L 67/1097 |
| | | | | 714/E11.034 |
| 2016/0196218 | A1* | 7/2016 | Kumar | G06F 11/1448 |
| | | | | 713/193 |
| 2016/0359704 | A1* | 12/2016 | Gandham | H04L 43/0888 |
| 2017/0083579 | A1* | 3/2017 | Du | G06F 16/23 |
| 2017/0272100 | A1* | 9/2017 | Yanovsky | G06F 12/1408 |
| 2019/0065391 | A1* | 2/2019 | Davis | G06F 3/0638 |
| 2019/0311148 | A1* | 10/2019 | Andrade | H04L 63/0861 |
| 2019/0327301 | A1* | 10/2019 | De Keyser | G06F 3/065 |
| 2022/0138118 | A1* | 5/2022 | Willoughby | G06F 3/067 |
| | | | | 710/118 |

FOREIGN PATENT DOCUMENTS

| | | | |
|---|---|---|---|
| WO | WO-2021185208 A1 * | 9/2021 | .......... H04L 45/566 |
| WO | 2022/003474 A1 | 1/2022 | |

OTHER PUBLICATIONS

Rabin, "Efficient dispersal of information for security, load balancing, and fault tolerance", Journal of the Association for Computing Machinery, ACM, New York, NY, US, vol. 36, No. 2, Apr. 1, 1989, p. 335-348.
Wikipedia, Secret Sharing, https://en.wikipedia.org/wiki/Secret_sharing, Retrieved Jun. 7, 2024.
Shamir, "How to Share a Secret", Communications of the ACM, 22 (11), Nov. 1979, pp. 612-613.
Wikipedia, "Unikernel", https://en.wikipedia.org/wiki/Unikernel, Retrieved Jun. 7, 2024.

* cited by examiner

METHOD TO SUBDIVIDE, DISTRIBUTE AND STORE DATA ASSOCIATED WITH A SUBJECT IN A PLURALITY OF DISTRIBUTED MEMORIES OF A TELECOMMUNICATIONS NETWORK AND RELATED ELECTRONIC SYSTEM FOR THE SUBDIVISION, DISTRIBUTION AND STORAGE OF THE DATA

BACKGROUND

Technical Field

The present disclosure generally relates to the field of data management associated with a subject.

More particularly, the present disclosure concerns a method to subdivide, distribute and store data associated with a subject in a plurality of distributed memories of a telecommunications network and related electronic system for the subdivision, distribution and storage of the data.

Description of the Related Art

Online verification systems of the digital identity of a subject, by means of a comparison between a reference profile of the previously acquired subject and a sample profile of the subject acquired in real time are known.

The reference/sample profile is for example a voice profile of the subject, or a video profile of the subject or a combination thereof.

PCT patent application having filing number PCT/IB2021/055428 describes to subdivide the reference voice profile into two or more portions and to store them in memories of respective network servers, so as to increase security and data protection.

PCT patent application having filing number PCT/US2020/017511 describes the subdivision of a reference biometric template (indicated by EBT=Enrollment Biometric Template) into a plurality of portions and the storage of said portions in a plurality of different network nodes; subsequently, the reference biometric template is reconstructed starting from the plurality of the portions thereof and a comparison is made between the reconstructed reference biometric template and a sample biometric template (ABS=Authentication Biometric Sample) acquired in real time.

US 2019/311148 A1 discloses a secure storage system for digital files, in which a digital file is subdivided into fragments, which are stored partly in a blockchain and partly outside the blockchain (for example, in one or more secure servers).

The Applicant noted that a disadvantage of the known techniques is that they do not sufficiently guarantee the distribution and storage of data associated with a subject in a secure and reliable manner and they do not sufficiently guarantee the confidentiality of the associated data, wherein said data is for example a voice/face profile that is used as a reference profile of the subject for a subsequent online verification of the identity of the user.

BRIEF SUMMARY

The present disclosure concerns a method, implemented by at least one computer, to subdivide, distribute and store data associated with a subject in a plurality of distributed memories as defined in the accompanying claim 1 and in the embodiments thereof described in the dependent claims 2 to 10 and 15 to 19.

The Applicant has perceived that the method for the subdivision, distribution and storage of the data in accordance with the present disclosure can guarantee the distribution and storage of the data associated with the subject in a secure and reliable manner and it can also guarantee the confidentiality of the data, while maintaining a good response rate in the phase of loading the data and in the phase of entry into the storage system.

Furthermore, the method for subdividing, distributing and storing the data according to the disclosure guarantees greater flexibility for the addition of new services. In fact, the data is managed in a decentralised system to which multiple services can be added on multiple servers that exploit the communication system and the related communication protocol; the services can access the data by requesting it from the system by simply adding their application logics.

The basic idea is to implement a software logic layer using a decentralised system architecture comprising a plurality of routers of messages in a telecommunications network, a plurality of network server components and a plurality of memories distributed over the network, and also using a particular logic of interpretation of the data associated with the subject that allows a subdivision (and subsequent reconstruction) of the data in a secure and reliable way.

One embodiment of the present disclosure is a non-transitory computer-readable storage medium as defined in the accompanying claim 11.

One embodiment of the present disclosure is a computer program comprising software code portions adapted to perform the steps of the method for subdividing, distributing and storing data associated with a subject according to the disclosure, when said program is run on at least one computer.

One embodiment of the present disclosure is an electronic system for the subdivision, distribution and storage of data associated with a subject in a plurality of distributed memories of a telecommunications network, wherein the electronic system is defined in the accompanying claim 12 and in the embodiments described in the dependent claims 13, 14 and 20.

BRIEF DESCRIPTION OF THE SEVERAL VIEWS OF THE DRAWINGS

Additional features and advantages of the disclosure will become more apparent from the description which follows of a embodiment and the variants thereof, provided by way of example with reference to the appended drawings, in which.

DETAILED DESCRIPTION

It should be noted that in the description below, identical or similar blocks, components or modules, even if they appear in different embodiments of the disclosure, are indicated by the same numerical references in the figures.

Figure 1:
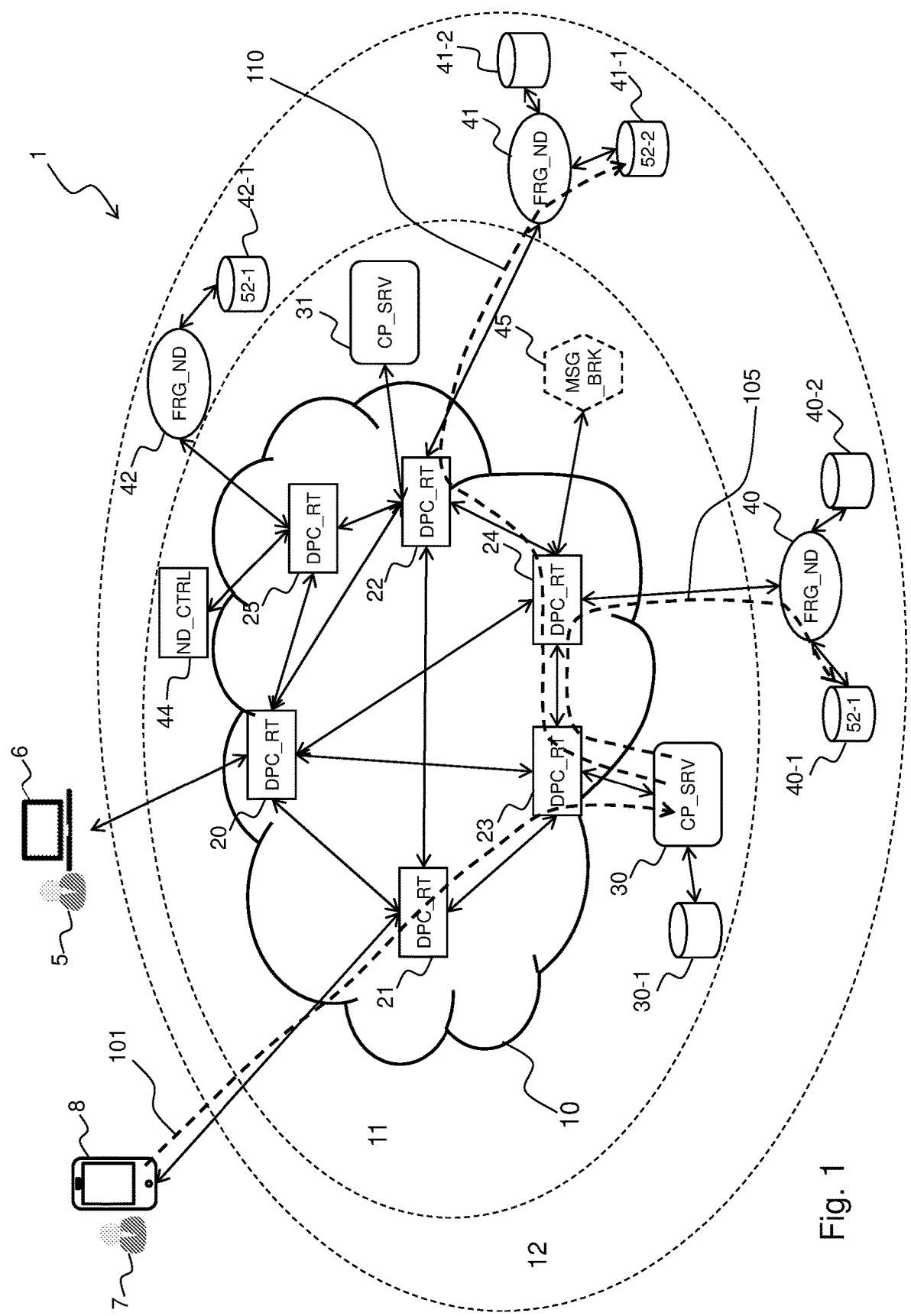
FIG. 1 shows a block diagram of an electronic system with distributed architecture for the subdivision, distribution and storage of data associated with a subject in a plurality of distributed memories of a telecommunications network according to the disclosure.

With reference to FIG. 1, it shows a block diagram of an electronic system 1 for the subdivision of data associated with a subject 7 in a plurality of portions and for their distribution and storage in a plurality of distributed memories according to the disclosure.

The electronic system 1 comprises two operation phases:
a first operation phase in which it is performed the subdivision, distribution and storage of the data in a plurality of distributed memories;
a subsequent second operation phase in which the reconstruction of the original data is performed starting from the plurality of portions stored in the distributed memories.

The electronic system 1 is implemented with a decentralised architecture, which allows creating fault-resilient systems by performing a redundancy of the (servers) nodes connected to a communication network that is in turn distributed and redundant, which adopts an extensible proprietary messaging protocol.

The communication system operates at the application level adopting proven and reliable protocols, systems and commercial hardware.

In addition, the decentralised topology allows the adoption of adaptive and automatic message routing strategies, reducing as much as possible the total processing time of a particular function on data.

For the purpose of explaining the disclosure, an example is taken into consideration in which the data is a reference voice profile of a subject 7 and in which the electronic system 1 has the function of performing an online verification of the digital identity of the subject 7, by means of a comparison between the reference voice profile of the subject 7 and a sample voice profile of the subject 7, in which:
the reference voice profile of the subject 7 is acquired during a profiling phase that takes place in a condition of maximum security during which personal data of the subject 7 (such as his/her name, surname, telephone number, identity card) and the reference voice profile of the subject 7 are acquired;
the sample voice profile of the subject 7 is acquired during a phase of normal operation (subsequent to the profiling phase), in which the real-time comparison is made between the reference voice profile of the subject 7 previously acquired and the sample voice profile acquired in real time.

The term "reference voice profile" of the subject 7 means a reference profile of the digital identity of the subject 7 generated as a function of an audio track of the voice of the subject 7, wherein said audio track (and thus the reference voice profile) is generated by means of the analogue-to-digital conversion of the voice of the subject 7 acquired in the profiling procedure by means of the microphone integrated in an electronic device 8 and in security conditions: the reference voice profile is therefore considered as reliable.

Similarly, the term "sample voice profile" of the subject 7 means a sample digital identity profile of the subject 7 generated as a function of a sample digital audio track of the voice of the subject 7, wherein said sample digital audio track is generated by means of the analogue-to-digital conversion of the voice of the subject 7 acquired in real time by means of the microphone integrated in the electronic device 8.

In the event that the sample voice/face profile is compatible (i.e. identical) to the reference voice/face profile, the digital identity has been successfully verified, i.e. the subject 7 is really who he/she claimed to be; otherwise, in the event that the sample voice/face profile is incompatible with (i.e. different from) the reference voice/face profile, the verification is negative, i.e. the subject 7 has not been successfully identified.

The reference/sample voice profile is implemented, for example, with an alphanumeric code generated by means of a suitable algorithm that receives as input a reference/sample digital audio track representative of the voice of the subject and generates an alphanumeric code (also referred to as a "fingerprint"), i.e. a string of alphanumeric characters, as output (by means of said algorithm).

The reference/sample digital audio track is acquired by addressing to the subject 7 (by means of a voice assistant integrated in the electronic device 8 or external thereto) one or more defined phrases (i.e. known in advance) and acquiring (by means of the same voice assistant) one or more corresponding responses from the subject 7, wherein said responses constitute the voice of the subject 7 which is converted from analogue to digital by generating a reference/sample digital audio track, which is used to generate the reference/sample voice profile.

It should be noted that the disclosure is also applicable to other data types associated with the subject 7 which are different from the reference voice profile, such as:
a reference face profile of the subject 7;
a combination of the reference voice/face profile of the subject 7;
a reference eye profile of the subject 7;
the fingerprint of the fingertip of a subject 7;
other types of biometric data associated with the subject 7, such as a footprint;
an image representative of an identity document of the subject 7;
data indicative of the tax code of the subject 7;
data indicative of the address of residence or domicile of the subject 7;
data representative of patterns of detected geographical positions of the subject 7 (for example, by means of the GPS satellite tracking system);
data indicative of an identity document of the subject 7;
data indicative of a diploma of the subject 7;
data indicative of a registration certificate of a vehicle of the subject 7;

a value indicative of the bank statement of a bank account of the subject 7;

a contract stipulated by the subject 7.

In particular, the electronic system 1 comprises an inner portion 10, an intermediate portion 11 and an outermost portion 12.

Furthermore, the electronic system 1 comprises a mobile electronic device 8 (for example, a smartphone, a tablet or a personal laptop) associated with a subject 7 and a fixed electronic device 6 (for example, a personal computer).

The inner portion 10 of the electronic system 1 is a telecommunications network comprising a plurality of network nodes (network core) connected to each other with a mesh topology, on which a plurality of message routers 20, 21, 22, 23, 24, 25 are implemented in software.

The intermediate portion 11 of the electronic system 1 comprises a plurality of server devices, each of which comprises a medium-long range signal transceiver and a processing unit (e.g., a microprocessor).

The mobile electronic device 8 comprises a processing unit (e.g., a microprocessor), a medium-long range signal transceiver, a screen, a microphone, a loudspeaker and a camera.

According to the first embodiment of the disclosure, the processing unit of the mobile electronic device 8 runs a software program that performs a subdivision of the data associated with the subject 7 (or 5) into a plurality of portions of the data and associates a respective fragment identifier to each portion of the data, as will be explained in more detail below relatively to the description of FIG. 3A.

The subdivision of the data is performed by means of an algorithm to which one or more data routing, replication and storage strategies optimized to reduce the time for crossing the electronic system 1 are associated.

In particular, said subdivision of the data associated with the subject 7 (or 5) is performed at the mobile electronic device 8 using information dispersal algorithms (IDA), such as Michael O. Rabin's algorithm (see document "Efficient dispersal of information for security, load balancing, and fault tolerance", Journal of the ACM. 36 (2): 335-348, 1989) and using secret et sharing techniques (see Wikipedia at the link https://en.wikipedia.org/wiki/Secret_sharing).

In particular, Adi Shamir's secret sharing scheme is used (see document "How to share a secret", Communications of the ACM, 22 (11): 612-613, 1979) in which the data is subdivided into a plurality of portions (called "shares") and in which a minimum number of portions must be recovered in order to be able to reconstruct the original data.

Each of the server devices runs a software program referred to hereinbelow as "server component", wherein for simplicity's sake in FIG. 1 two server components 30, 31 are shown.

Figure 3A:
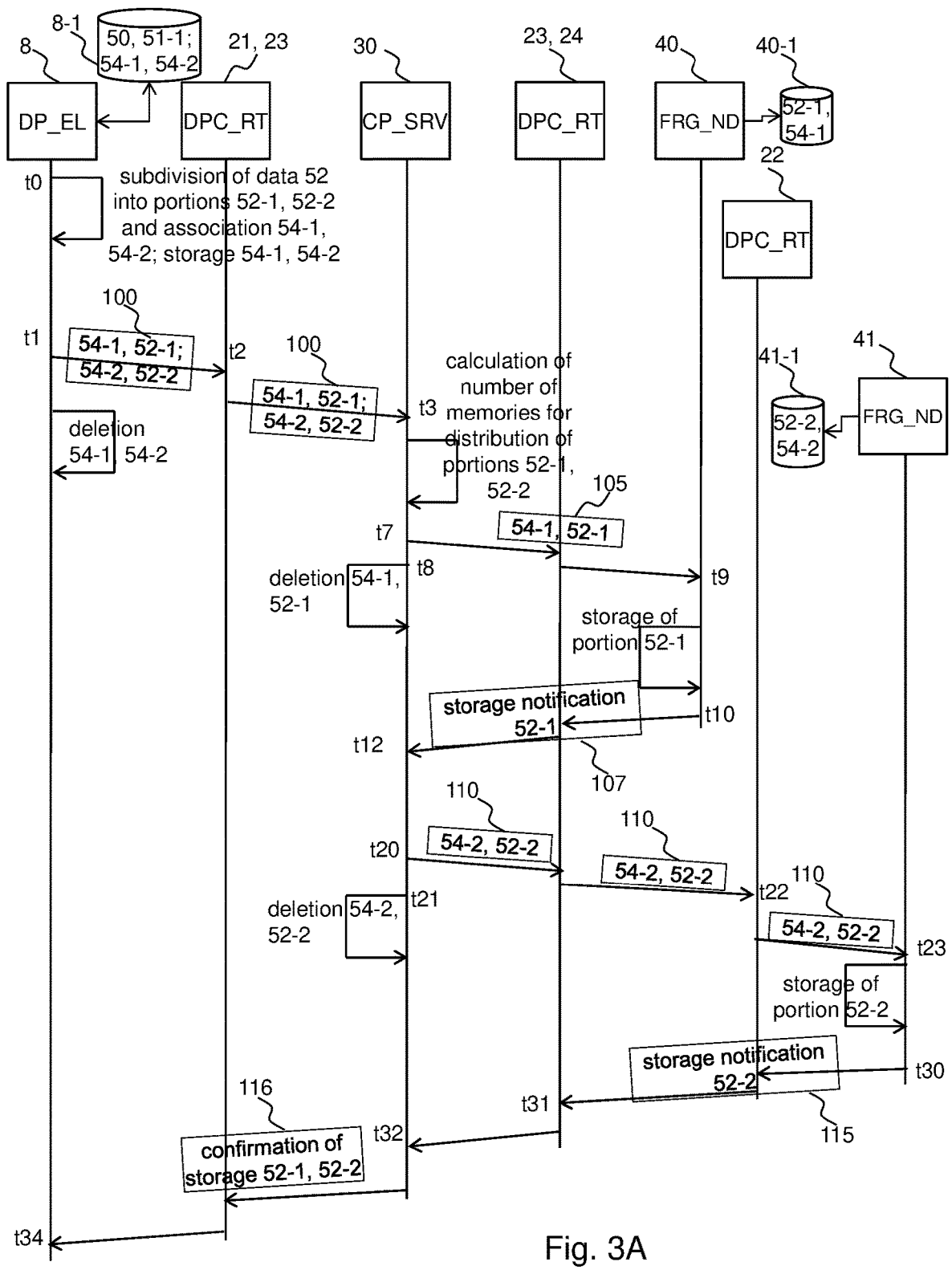
FIG. 3A shows a time diagram of the messages exchanged between the elements of the electronic system of FIG. 1 to subdivide, distribute and store data associated with a subject in a plurality of distributed memories of a telecommunications network according to a first embodiment of the disclosure.

According to a first and a second embodiment of the disclosure, the server components 30, 31 have the function of calculating the number of distributed memories in which to store a plurality of portions (i.e. fragments) of the data associated with the subject 7 (or 5) and have the function of distributing the plurality of portions of the data associated with the subject 7 (or 5) in a plurality of distributed memories 40-1, 40-2, 41-1, 41-2, 42-1 associated with the fragment storage nodes 40, 41, 42, as will be explained in more detail below relatively to the description of FIG. 3A.

Furthermore, according to the first embodiment, the server components 30, 31 have the function of collecting from at least part of the fragment storage nodes 40, 41, 42 a plurality of portions of the data associated with the subject 7 (or 5), thus the plurality of collected portions is forwarded towards the electronic device 8 (or 6) or towards the software application directly connected with the server devices 30 and/or 31.

According to a second embodiment of the disclosure, the server components 30, 31 have the further function of receiving the data associated with the subject 7 (or 5), performing a subdivision of the data associated with the subject 7 (or 5) into a plurality of portions of the data, associating a respective fragment identifier to each portion of the data, in addition to the calculation and distribution function, as will be explained in more detail below relatively to the description of FIG. 4A.

In particular, said subdivision of the data associated with the subject 7 (or 5) is performed in the server components 30, 31 using information dispersal algorithms (IDA), such as Michael O. Rabin's algorithm (see document "Efficient dispersal of information for security, load balancing, and fault tolerance", Journal of the ACM. 36 (2): 335-348, 1989) and using secret sharing techniques (see Wikipedia at the link https://en.wikipedia.org/wiki/Secret_sharing).

In particular, Adi Shamir's secret sharing scheme is used (see document "How to share a secret", Communications of the ACM, 22 (11): 612-613, 1979) in which the data is subdivided into a plurality of portions (called "shares") and in which a minimum number of portions must be recovered in order to be able to reconstruct the original data.

Furthermore, based on the second embodiment, the server components 30, 31 have the function of collecting from at least part of the fragment storage nodes 40, 41, 42 a plurality of portions of the data associated with the subject 7 (or 5), thus the plurality of collected portions is forwarded towards the electronic device 8 (or 6) or towards the software application directly connected with the server devices 30 and/or 31.

In one embodiment, the intermediate portion 11 of the electronic system 1 further comprises a control node 44 which has the function of controlling the real-time creation and destruction of the server components 30, 31.

In other words, the server components 30, 31 are created and destroyed in real time by the control node 44 for only the moment of data processing and subsequent routing through the message routers to exist, thus further increasing the total security of the system with respect to the data.

The enabling technology for this system implementation is based on the unikernel concept (see for example Wikipedia at the link https://en.wikipedia.org/wiki/Unikernel), based on which light virtual machines can be created and destroyed in a few milliseconds.

The outer portion 12 of the electronic system 1 comprises a plurality of fragment storage nodes, wherein for simplicity's sake in FIG. 1 three fragment storage nodes 40, 41, 42 are shown.

The fragment storage nodes 40, 41, 42 have the function of storing portions of the data associated with the subject 7 (or 5) in a plurality of distributed memories, using heterogeneous storage technologies, RAM, object database, noSQL database.

In addition, the storage of the portions of the data associated with the subject 7 can be performed in multiple public/private and different clouds.

The message routers 20, 21, 22, 23, 24, 25 are software components that are executed on processing units of respective elements of the telecommunications network 10, which may be a telecommunications network of fixed type (e.g., the Internet network) or of a radio mobile type, or a combination thereof.

Said network elements therefore each comprise a medium-long range signal transceiver and a processing unit (e.g., a microprocessor) running the software components of the message routers 20, 21, 22, 23, 24, 25.

The message routers 20, 21, 22, 23, 24, 25 have the function of receiving the messages generated by the mobile electronic device 8 (or by the fixed electronic device 6) and of appropriately routing them towards one or more server components 30, 31.

Moreover, the message routers 20, 21, 22, 23, 24, 25 have the function of receiving the messages generated by the server devices 30, 31 and of routing them towards the fragment storage nodes 40, 41, 42 or towards the mobile electronic device 8 (or towards the fixed electronic device 6).

Furthermore, the message routers 20, 21, 22, 23, 24, 25 have the function of receiving the messages generated by the fragment storage nodes 40, 41, 42 and of routing them towards the server components 30, 31.

The fragment storage nodes 40, 41, 42 are electronic devices (for example, network servers) having the function of storing one or more portions of the data associated with the user 7 (or 5).

To this end, each of the fragment storage nodes 40, 41, 42 comprises at least one respective non-volatile memory 40-1, 41-1, 42-1 which is internal or external thereto (i.e., a database) to store a part of the plurality of portions of the data associated with the subject 7 (or 5).

The fragment storage nodes 40, 41, 42 therefore have the function of receiving one or more portions of the data associated with the subject 7 and/or 5 and of storing them within the at least one respective memory 40-1, 41-1, 42-1 associated therewith, as will be explained in more detail below with reference to FIG. 3A.

For this purpose, the fragment storage nodes 40, 41, 42 each comprise a medium-long range signal transceiver and a processing unit (e.g., a microprocessor).

In one embodiment, the intermediate portion 11 of the electronic system 1 further comprises a message broker 45 having the function of ensuring the delivery of the messages exchanged through the telecommunications network 10.

Figure 2:
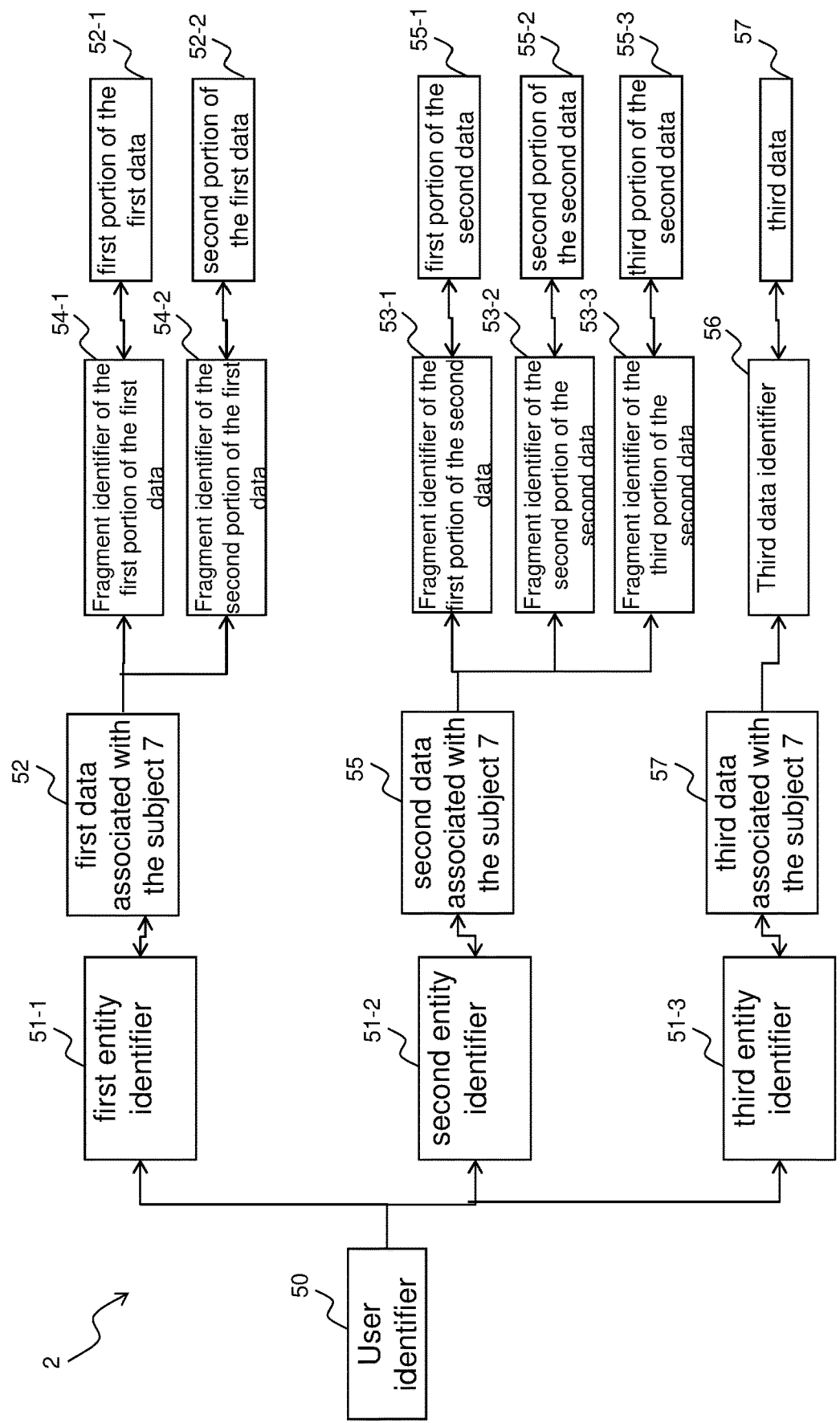
FIG. 2 shows a scheme of logic of interpretation of data associated with a subject according to the disclosure.

With reference to FIG. 2, it shows a scheme 2 of the logic of interpretation of data associated with the subject 7.

According to the first embodiment of the disclosure, the scheme 2 is entirely implemented on the mobile electronic device 8 (or on the fixed electronic device 6), by means of a processing unit running a suitable software program. Alternatively, the scheme 2 is implemented by means of a software application that communicates directly with one of the server components 30, 31.

Based on the second embodiment of the disclosure, the scheme 2 is implemented partly on the mobile electronic device 8 (or on the fixed electronic device 6) and partly on one of the server components 30, 31.

The data associated with the subject 7 is, for example, the reference voice profile of the subject 7, which was acquired in the profiling phase.

The logic of interpretation of the data of FIG. 2 uses the following identifiers:
  user identifier: it is an alphanumeric string uniquely identifying a subject from other subjects;
  entity identifier: it is an alphanumeric string uniquely identifying a type of data associated with a subject (for example, reference voice profile, reference face profile, reference eye profile, reference fingerprint), in order to distinguish a particular type of data from another (for example, to distinguish a reference voice profile from a reference face profile);
  fragment identifier: it is an alphanumeric string uniquely identifying a portion into which data associated with the subject 7 has been subdivided.

For example, the user identifier is an alphanumeric string obtained with a hashing algorithm, such as SHA512.

In particular, the hash function takes as input a concatenation of different strings of data associated with the subject 7 (for example, name, surname, email address, password) and generates as output the user identifier which is a unique hexadecimal alphanumeric string.

Similarly, the entity identifier is an alphanumeric string obtained with a hashing algorithm, such as SHA512.

In particular, the hash function takes as input binary data associated with the subject 7 (for example, data of his/her identity card, e-mail address, social security position number, graduation certificate data) and generates the entity identifier that is a unique hexadecimal alphanumeric string.

Similarly, the fragment identifier is an alphanumeric string obtained with a hashing algorithm, such as SHA512.

In particular, the hash function takes as input binary data representing a particular portion (fragment) of the data under consideration and generates as output the fragment identifier which is a unique hexadecimal alphanumeric string.

Referring in particular to FIG. 2, it is configured a user identifier 50 uniquely associated with the subject 7 in order to uniquely identify the subject 7 and distinguish him/her from the subject 5.

It is assumed that the subject 7 is associated with the following three types of data:
  the first data 52 associated with the subject 7 is the reference voice profile of the subject 7;
  the second data 55 associated with the subject 7 is the reference face profile of the subject 7;
  the third data 57 associated with the subject 7 is an image representative of the identity document of the subject 7.

The following three entity identifiers 51-1, 51-2, 51-3 are also configured:
  a first entity identifier 51-1 has the function of indicating that the type of data associated with the subject 7 is the reference voice profile of the subject 7;
  a second identity identifier 51-2 has the function of indicating that the type of data associated with the subject 7 is a reference voice profile of the subject 7;
  a third identity identifier 51-3, which has the function of indicating that the type of data associated with the subject 7 is an identity document of the subject 7.

The first data 52 (reference voice profile of the subject 7) is subdivided into two portions 52-1, 52-2.

Similarly, the second data 55 (reference face profile of the subject 7) is subdivided into three portions 55-1, 55-2; 55-3; the third data 57 (image of the identity document of the subject 7) is not subdivided into portions.

Finally, a fragment identifier is assigned to each portion of the first, second and third data, in particular:
  a value of a fragment identifier 54-1 uniquely identifying the first portion 52-1 of the first data 52 is assigned;
  a value of a fragment identifier 54-2 uniquely identifying the second portion 52-2 of the first data 52 is assigned;
  a value of a fragment identifier 53-1 uniquely identifying the first portion 55-1 of the second data 55 is assigned;
  a value of a fragment identifier 53-2 uniquely identifying the second portion 55-2 of the second data 55 is assigned;

a value of a fragment identifier 53-3 uniquely identifying the third portion 55-3 of the second data 55 is assigned;

a value of a fragment identifier 56 uniquely identifying the third data 57 is assigned.

Note that for simplicity's sake in FIG. 2, data associated with a subject subdivided into two or three portions have been considered, but more generally the disclosure is applicable to a number of portions of the data greater than or equal to two.

According to the disclosure, the two portions 52-1, 52-2 of the first data (reference voice profile) and the two corresponding values of the fragment identifier 54-1, 54-2 of the two portions 52-1, 52-2 of the first data 52 (reference voice profile) are respectively stored in two different memories selected from the memories 40-1, 41-1, 42-1 of the three different fragment storage nodes 40, 41, 42, as will be explained in more detail below relatively to the description of FIG. 3A.

Similarly, the three portions 55-1, 55-2, 55-3 of the second data (reference facee profile) and the three corresponding values 53-1, 53-2, 53-3 of the fragment identifier of the three portions 55-1, 55-2, 55-3 of the second data (reference facee profile) are stored respectively in the three different memories 40-1, 41-1, 42-1 of the three fragment storage nodes 40, 41, 42.

Finally, the third data 57 (identification data of the identity document of the subject 7) and the corresponding value 56 of the identifier of the third data 57 (identification data of the identity document of the subject 7) is stored in a memory selected from the three memories 40-1, 41-1, 42-1 of the three fragment storage nodes 40, 41, 42.

The previous considerations of FIG. 2 regarding the subject 7 are applicable in a similar way to the subject 5, thus the scheme 2 of the logic of interpretation of the data is implemented on the fixed electronic device 6 or on a device, it is configures another value of the user identifier associated with the subject 5 other than the value of the user identifier 50 associated with the subject 7, other values of the entity identifiers other than the values of the first, second, third entity identifiers 51-1, 51-2, 51-3 are configured.

According to an aspect of the first or second embodiment, each of the fragment storage nodes 40, 41, 42 comprises two or more non-volatile memories external thereto (databases) for storing two or more different portions of the data associated with the subject 7 (or 5), wherein the number of portions stored in the memories associated with each of the fragment storage nodes 40, 41, 42 is less than the total number of the portions into which the data associated with the subject 7 (or 5) has been subdivided.

For example, FIG. 2 shows that there are two memories 40-1, 40-2 connected with the fragment storage node 40 and there are two memories 41-1, 41-2 connected with the fragment storage node 41: considering the case of FIG. 2 of the second data 55 subdivided into three portions 55-1, 55-2, 55-3, the memory 40-1 is such to store the first portion 55-1, the memory 40-2 is such that it stores the second portion 55-2, the memory 41-1 is such that it stores the third portion 55-3.

According to another aspect of the first or second embodiment, a redundancy of the storage of the portions of the data associated with the subject 7 (or 5) is performed, i.e. one or more portions are duplicated in one or more copies and these are stored in two or more different distributed memories of the portion 12 of the electronic system 1: in this way in case of failure of a first memory containing a certain portion of the data, it is possible to recover the same portion of the data from a second memory which therefore functions as a backup of the first faulty memory, thus increasing the reliability of the system 1.

For example, considering again the case of FIG. 2 of the second data 55 subdivided into three portions 55-1, 55-2, 55-3, the memory 40-1 is such to store the first portion 55-1, the memory 40-2 is such to store the second portion 55-2, the memory 41-1 is such to store the third portion 55-3 and the memory 41-2 is such to store the first portion 55-1. In this example, a redundancy of the storage of the first portion 55-1 is performed which is stored in two different memories 40-1 and 41-2: therefore in case of failure of the memory 40-1, the first portion 55-1 can be recovered from the memory 41-2, or vice versa.

Similarly, considering the case of FIG. 2 of the first data 52 subdivided into two portions 52-1, 52-2, the memory 40-1 is such to store the first portion 52-1, the memory 41-1 is such to store the second portion 52-2 and the memory 42-1 is such to store the first portion 52-1. In this example, it is thus performed a redundancy of the storage of the first portion 52-1 which is stored in two different memories 40-1 and 42-1: therefore in case of failure of the memory 40-1, it is possible to recover the first portion 52-1 of the first data 52 from the memory 42-1, or vice versa.

It will be now described the operation of the electronic system 1 during the first operation phase wherein it is performed the subdivision, distribution and storage of the data associated with the subject 7 according to the first embodiment, also referring to FIGS. 2 and 3A.

For simplicity's sake, it is assumed that the data associated with the subject 7 is the reference voice profile of the subject 7, which will be used in a subsequent phase of online verification of the digital identity of the subject 7 (the latter not shown in FIG. 3A).

It is also assumed that the reference voice profile 52 is subdivided into two portions 52-1, 52-2, as indicated at the top of the scheme of FIG. 2.

Furthermore, it is assumed that the mobile electronic device 8 is a smartphone and that the value of the user identifier 50 uniquely identifying the subject 7 and the value of the first entity identifier 51-1 indicating that the data type is the reference voice profile 52 of the subject 7 have been configured, wherein said values of the user identifier 50 and of the first entity identifier 51-1 are stored in a memory 8-1 that is internal to the smartphone 8.

At the initial instant to, the processing unit of the smartphone 8 generates the reference voice profile 52 of the subject 7, as a function of an audio track of the voice of the subject 7 acquired by means of the microphone integrated in the smartphone 8.

In particular, the reference voice profile 52 is an alphanumeric code (i.e. a string of alphanumeric characters) generated by means of a hash algorithm receiving in input the digital audio track of the voice of the subject 7 that pronounces aloud an answer to a defined question (i.e. known in advance).

Subsequently, the processing unit of the smartphone 8 subdivides the reference voice profile 52 into two portions 52-1, 52-2, each of which is therefore also composed of a string of alphanumeric characters.

Figure 3B:
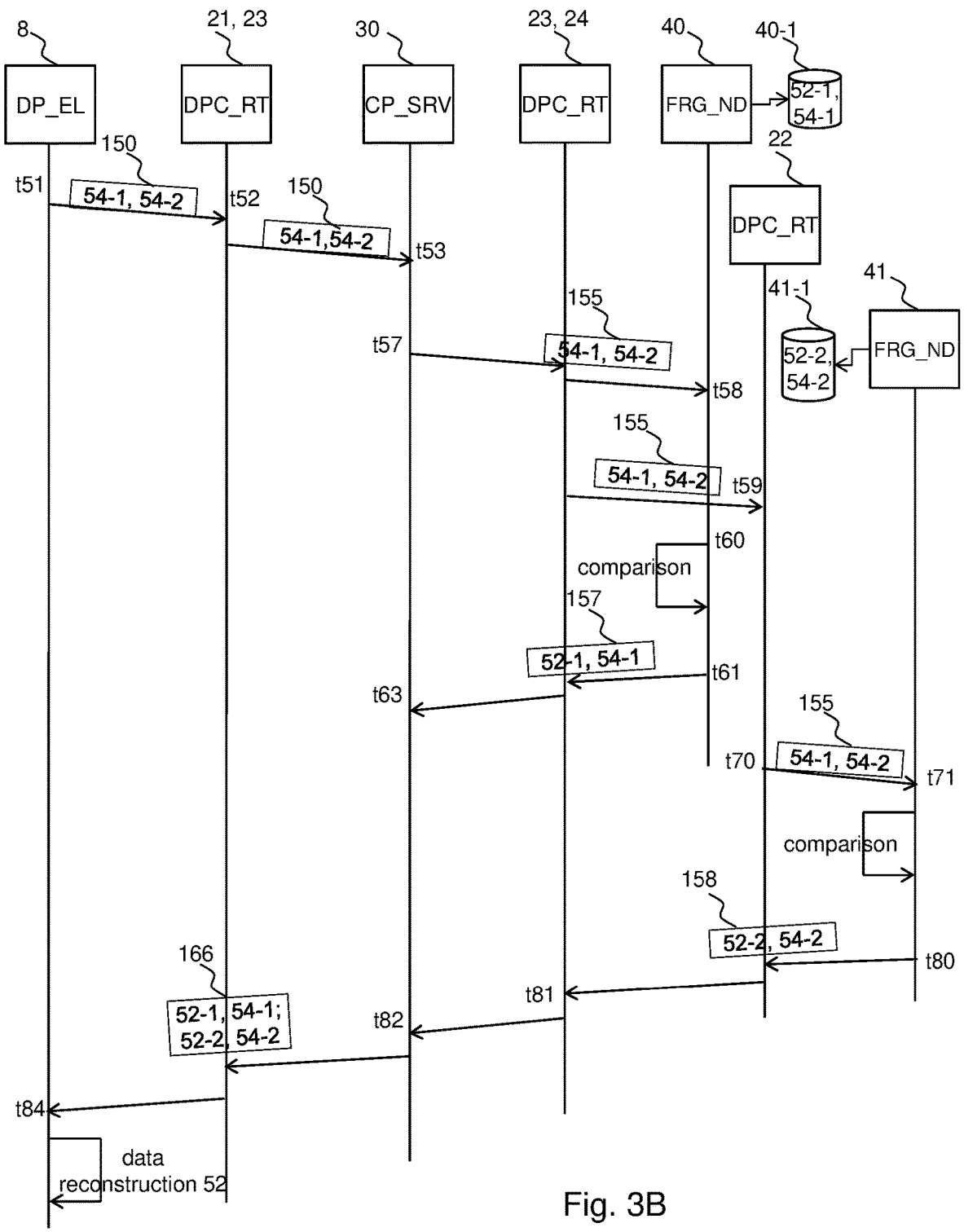
FIG. 3B shows a time diagram of the messages exchanged between the elements of the electronic system of FIG. 1 to reconstruct data associated with a subject from a plurality of portions of the data stored in a plurality of distributed memories of the telecommunications network according to the first embodiment of the disclosure.

Furthermore, the processing unit of the smartphone 8 generates a fragment identifier associating it with each portion 52-1, 52-2 of the reference voice profile 52, namely:

a first fragment identifier 54-1 is associated with the first portion 52-1 during a first operation phase of the electronic system 1, in order to uniquely identify the first portion 52-1 in a second phase in which the reconstruction of the reference voice profile 52 is performed starting from the portions thereof 52-1, 52-2;

a second fragment identifier 54-2 is associated with the second portion 52-2 during the first operation phase, in order to uniquely identify the second portion 52-2 in the subsequent second phase of reconstructing the reference voice profile 52, as will be illustrated in more detail relatively to the description of FIG. 3B.

Subsequently, the processing unit of the smartphone 8 stores in the memory 8-1 the values of the fragment identifiers 54-1, 54-2.

At the instant t1 (subsequent to t0), the processing unit of the smartphone 8 thus generates a storage request message 100 carrying the first portion 52-1 of the reference voice profile 52 and the corresponding value of the first fragment identifier 54-1 uniquely identifying the first portion 52-1, and the second portion 52-2 of the reference voice profile 52 and the corresponding value of the second fragment identifier 54-2 uniquely identifying the second portion 52-2.

The transceiver of the smartphone 8 receives the storage request message 100 and this is transmitted towards the server component 30 through the telecommunications network 10.

Subsequently, the processing unit of the smartphone 8 performs a deletion of the first and second portion 52-1, 52-2 of the reference voice profile 52; in other words, the smartphone 8 does not perform any storage of the first and second portion 52-1, 52-2, which are deleted immediately after they have been sent towards the server component 30 through the telecommunications network 10.

The storage request message 100 is routed towards the server component 30 via the message routers 21 and 23 (see in FIG. 1 the path 101 indicated with a dashed line).

At the instant t3 (subsequent to t1) the transceiver of the server device on which the server component 30 is executed receives the storage request message 100, which is forwarded to the processing unit executing the server component 30.

The processing unit executing the server component 30 runs an algorithm that calculates on how many memories to distribute the two portions 52-1, 52-2 of the reference voice profile 52 based on predefined logics; for simplicity's sake it is considered that the processing unit decides to distribute the two portions 52-1, 52-2 of the reference voice profile 52 in two distributed memories.

At the instant t7 (subsequent to t3), the processing unit executing the server component 30 generates a first distribution message 105 carrying the first portion 52-1 of the reference voice profile 52 and the corresponding value of the first fragment identifier 54-1 uniquely identifying the first portion 52-1; further, the processing unit executing the server component 30 generates a second distribution message 110 carrying the second portion 52-2 of the reference voice profile 52 and the corresponding value of the second fragment identifier 54-2 uniquely identifying the second portion 52-2.

Next, the server device transceiver of the server component 30 transmits the first distribution message 105 towards the telecommunications network 10.

At the instant t8 (subsequent to t7) the server component 30 performs the deletion of the first value of the fragment identifier 54-1 and the deletion of the first portion 52-1 of the reference voice profile 52.

In other words, the server device executing the server component 30 does not perform any storage of the first portion 52-1 of the reference voice profile or of the value of the respective first fragment identifier 54-1, that is, said values are deleted by the server component 30 immediately after they have been sent towards the fragment storage node 40 through the telecommunications network 10.

For simplicity's sake, the message routers are assumed to perform the following routing of the first and second distribution message 105 and 110:

the first distribution message 105 is received by the message router 23, which forwards it to the message router 24, which in turn forwards it towards the fragment storage node 40 (see in FIG. 1 the path 105 indicated with a dashed line);

the second distribution message 110 is received by the message router 23, which forwards it to the message router 24, which forwards it to the message router 22, which in turn forwards it towards the fragment storage node 41 (see in FIG. 1 the path 110 indicated with a dashed line).

At the instant t9 (subsequent to t7) the transceiver of the fragment storage node 40 receives the message 105 and forwards it to its processing unit, then the processing unit stores into the non-volatile memory 40-1 the first portion 52-1 of the reference voice profile 52 and the corresponding value of the first fragment identifier 54-1.

At the instant t10 (subsequent to t8) the transceiver of the fragment storage node 40 transmits towards the server component 30 a first notification message 107 indicative of a notification of the storage of the first portion 52-1 of the reference voice profile 52, then the first notification message 107 is received by the message routers 24 and 23 and forwarded towards the server component 30.

At the instant t12 (subsequent to t10) the server component 30 receives the first notification message 107.

At the instant t20 (subsequent to t7) the server transceiver of the server device of the server component 30 transmits towards the telecommunications network 10 the second distribution message 110 carrying the second portion 52-2 of the reference voice profile 52 and the corresponding value of the second fragment identifier 54-2.

At the instant t21 (subsequent to t20) the server component 30 performs the deletion of the second value of the fragment identifier 54-2 and the deletion of the second portion 52-2 of the reference voice profile 52.

In other words, the server device executing the server component 30 does not perform any storage of the second portion 52-2 of the reference voice profile or of the value of the respective second fragment identifier 54-2, that is, said values are deleted by the server component 30 immediately after they have been sent towards the fragment storage node 41 through the telecommunications network 10.

At the instant t23 (subsequent to t21) the transceiver of the fragment storage node 41 receives the second distribution message 110 and forwards it to its processing unit, then the processing unit stores in the non-volatile memory 41-1 the second portion 52-2 of the reference voice profile 52 and the corresponding value of the second fragment identifier 54-2.

At the instant t30 (subsequent to t23) the transceiver of the fragment storage node 41 transmits towards the server component 30 a second notification message 115 indicative of a notification of the storage of the second portion 52-2 of the reference voice profile 52, then the second notification message 115 is received by the message routers 22, 24 and 23 and forwarded towards the server component 30.

At the instant t32 (subsequent to t30) the server component 30 receives the second notification message 115, detects that the notification messages associated with all the portions into which the data has been subdivided have been received (i.e. the notification message 107 and the notification message 115 have been received) and then the server component 30 generates a storage confirmation message 116 indicative of a positive confirmation of the storage of the two portions 52-1, 52-2.

Subsequently, the transceiver of the server device executing the server component 30 transmits towards the telecommunications network 10 the storage confirmation message 116 addressed towards the smartphone, then the storage confirmation message 116 is received by the message routers 23 and 21 and forwarded towards the smartphone 8.

At the instant t33 (subsequent to t31) the smartphone 8 receives said memory confirmation message 116 and then the processing unit of the smartphone 8 detects that the first and second portions 52-1, 52-2 of the reference voice profile 52 have been successfully stored in two distributed memories of the portion 12 of the electronic system 1.

Note that in FIG. 3A it has been shown that the first notification message 107 is transmitted before the transmission of the second distribution message 110, but alternatively it is possible that the second distribution message 110 is transmitted by the server component 30 before the first notification message 107 is transmitted by the fragment storage node 40.

It will be now described the operation of the electronic system 1 in the second operation phase in which the portions of the data associated with the subject 7 are recovered based on the first embodiment, also referring to FIGS. 2 and 3B.

At the initial instant t51, the processing unit of the smartphone 8 generates a request for recovery of the portions of the reference voice profile of the subject 7, by means of the values of the fragment identifiers 54-1, 54-2 that have been previously stored at the instant t0 in the memory 8-1 during the first phase of fragmentation of the reference voice profile of the subject 7.

The transceiver of the smartphone 8 receives the request for recovery of the portions of the reference voice profile and generates therefrom a data recovery request message 150 carrying the values of the first fragment identifier 54-1 and the second fragment identifier 54-2, wherein said message 150 is transmitted towards the telecommunications network 10.

The recovery request message 150 is routed towards the server component 30 via the message routers 21 and 23.

At the instant t53 (subsequent to t51) the transceiver of the server device on which the server component 30 is run receives the data recovery request message 150, which is forwarded to the processing unit executing the server component 30.

The processing unit executing the server component 30 generates a message 155 carrying the values of the first fragment identifier 54-1 and of the second fragment identifier 54-2.

Subsequently, the transceiver of the server device of the server component 30 transmits towards the telecommunications network 10 the message 155, which is routed towards the fragment storage node 40 by means of the message routers 23, 24.

In addition, the message 155 is also routed towards the fragment storage node 41 via the message router 22.

At the instant t58 the transceiver of the fragment storage node 40 receives the message 155 and forwards it to its processing unit, while at the instant t71 (subsequent to t58) the transceiver of the fragment storage node 41 receives the message 155 and forwards it to its processing unit.

At the instant t60, the processing unit of the fragment storage node 40 extracts from the message 155 the values of the first fragment identifier 54-1 and of the second fragment identifier 54-2, reads from the memory 40-1 the stored value of the first fragment identifier 54-1, makes a comparison between the stored value of the first fragment identifier 54-1 and the received values of the first and second fragment identifiers 54-1, 54-2, and detects that the received value of the first fragment identifier 54-1 is equal to the stored value of the first fragment identifier 54-1.

Therefore at the instant t60 it has been detected that in memory 40-1 one of the two portions of the reference voice profile is stored, i.e. the portion 52-1 associated with the first fragment identifier 54-1.

Accordingly, at the instant t61 the transceiver of the fragment storage node 40 transmits towards the server component 30 a message 157 carrying the value of the first portion 52-1 of the reference voice profile 52, together with the value of the first fragment identifier 54-1.

The message 157 is routed towards the server component 30 via the message routers 24 and 23.

Similarly, at the instant t71, the processing unit of the fragment storage node 41 extracts from the message 155 the values of the first fragment identifier 54-1 and of the second fragment identifier 54-2, reads from the memory 41-1 the stored value of the second identifier 54-2, makes a comparison between the stored value of the second fragment identifier 54-2 and the received values of the first and second fragment identifier 54-1, 54-2, and detects that the received value of the second fragment identifier 54-2 is equal to the stored value of the second fragment identifier 54-2.

Therefore at the instant t71 it has been detected that in memory 41-1 the other of the two portions of the reference voice profile is stored, that is, the second portion 52-2 associated with the second fragment identifier 54-2.

Accordingly, at the instant t80 the transceiver of the fragment storage node 41 transmits towards the server component 30 a message 158 carrying the value of the second portion 52-2 of the reference voice profile 52, together with the value of the second fragment identifier 54-2.

The message 158 is routed towards the server component 30 via the message routers 22, 24, and 23.

At the instant t63 the transceiver of the server device executing the server component 30 receives the message 157 and at the instant t82 it receives the message 158, then the server component 30 detects that all the portions 52-1, 52-2 of the data 52 that had been requested have been received, and transmits towards the smartphone 8 a recovery confirmation message 166 carrying the first portion 52-1 and the second portion 52-2 of the reference voice profile, together with the corresponding values of the first fragment identifier 54-1 and of the second fragment identifier 54-2.

The message 166 is routed towards the smartphone 8 by the message routers 23 and 21.

At the instant t84 the transceiver of the smartphone 8 receives the message 166 carrying the first portion 52-1 and the second portion 52-2 of the reference voice profile, together with the corresponding values of the first fragment identifier 54-1 and of the second fragment identifier 54-2, then the processing unit of the smartphone 8 reconstructs the reference voice profile 52 starting from the first received portion 52-1 and from the second received portion 52-2.

Figure 4A:
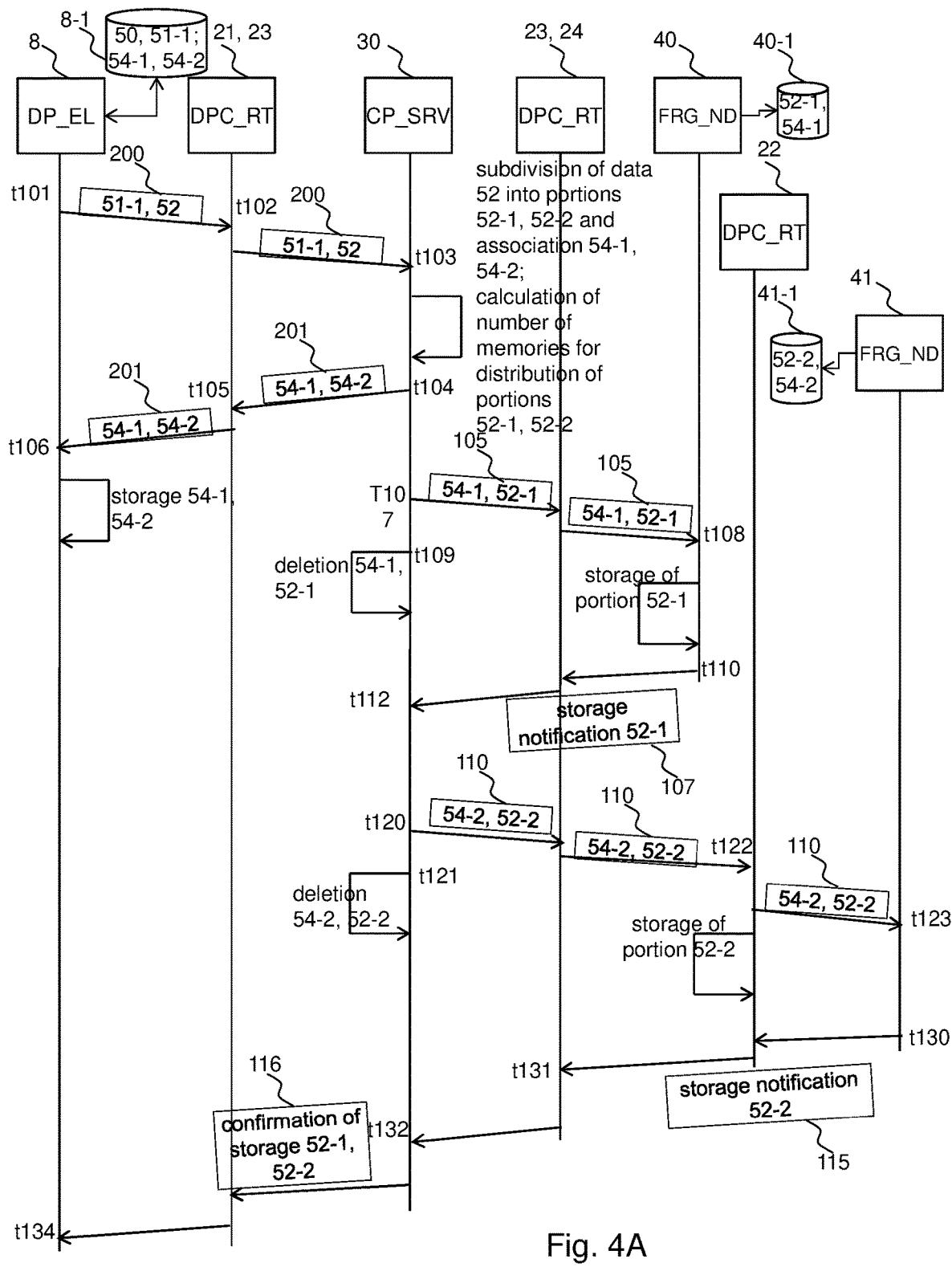
FIG. 4A shows a time diagram of the messages exchanged between the elements of the electronic system of FIG. 1 to subdivide, distribute and store data associated with a subject in a plurality of distributed memories of a telecommunications network according to a second embodiment of the disclosure.

It will be now described the operation of the electronic system 1 during the first operation phase in which the subdivision, distribution and storage of the data associated with the subject 7 is performed based on the second embodiment, also referring to FIGS. 2 and 4A.

The second embodiment of FIG. 4A differs from the first embodiment of FIG. 3A in that the subdivision of the data associated with the subject 7 (in the example considered its voice reference profile) into two portions 52-1, 52-2 and the respective association with the fragment identifiers 54-1, 54-2 is performed on the server component 30 (instead of on the mobile electronic device 8) and in that the list of the fragment identifiers 54-1, 54-1 is communicated by the server component 30 to the mobile electronic device 8.

In particular, at the instant t100 the values of the user identifier 50 and of the first entity identifier 51-1 are stored in a memory 8-1 inside the smartphone 8.

Furthermore, the processing unit of the smartphone 8 generates the reference voice profile 52 of the subject 7, as a function of an audio track of the voice of the subject 7 acquired by means of the microphone integrated in the smartphone 8, then said reference voice profile 52 is transmitted from the processing unit to the medium-long distance transceiver of the smartphone 8.

At the instant t101 the transceiver of the smartphone 8 transmits towards the server component 30 a request message 200 carrying the reference voice profile 52, together with the value of the first entity identifier 51-1.

The request message 200 is received by the telecommunications network 10 and is routed towards the server component 30 by the message routers 21 and 23.

At the instant t103 (subsequent to t101) the transceiver of the server device on which the server component 30 is run receives the request message 200 carrying the reference voice profile 52 and the value of the first entity identifier 51-1, then the request message 200 is forwarded to the processing unit executing the server component 30.

The processing unit extracts from the message 200 the value of the first entity identifier 51-1 and the reference voice profile 52, then subdivides the reference voice profile 52 into two portions 52-1, 52-2, which are thus each of them composed of a string of alphanumeric characters.

Figure 4B:
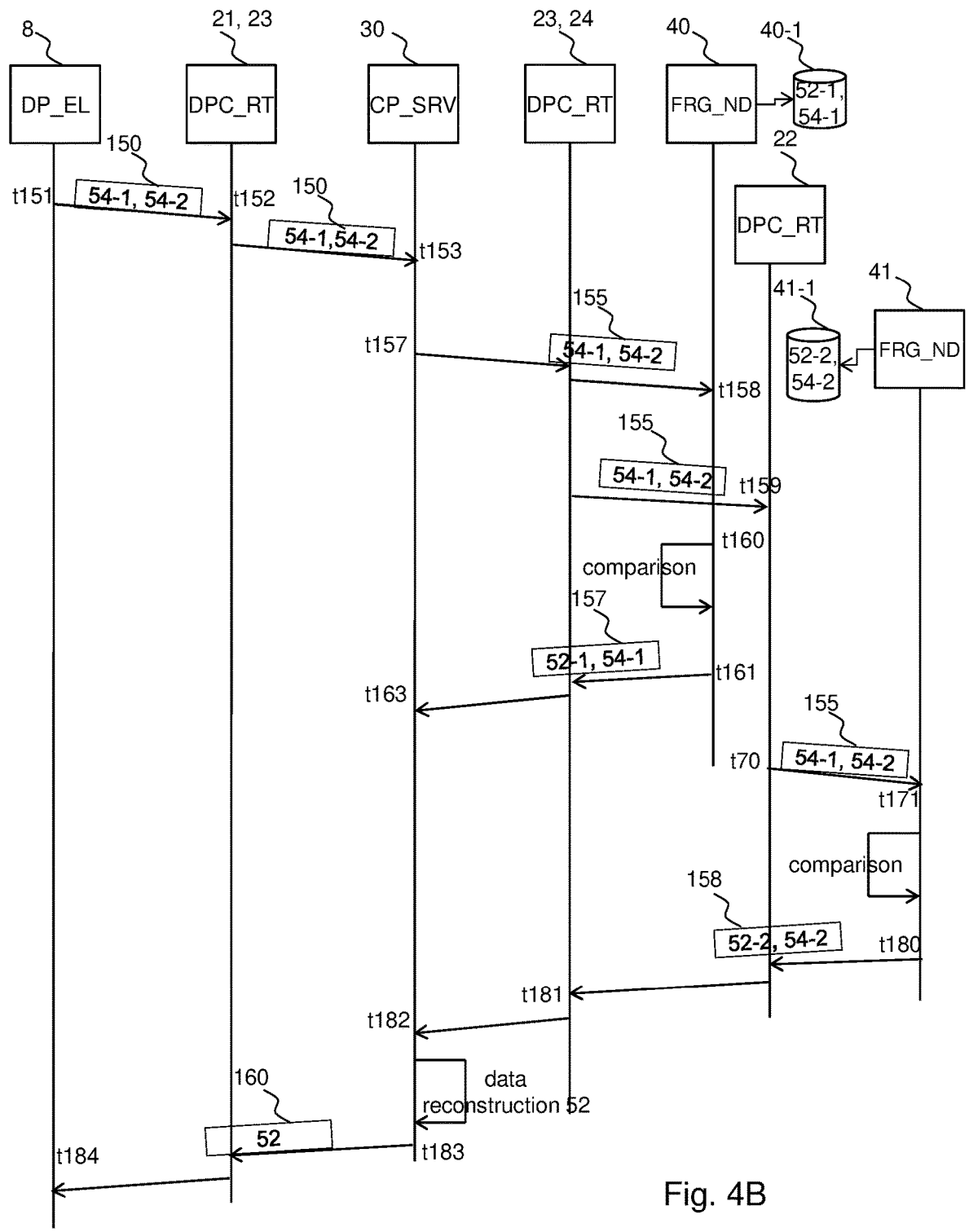
FIG. 4B shows a time diagram of the messages exchanged between the elements of the electronic system of FIG. 1 to reconstruct data associated with a subject from a plurality of portions of the data stored in a plurality of distributed memories of the telecommunications network according to the second embodiment of the disclosure.

In addition, the processing unit executing the server component 30 associates a fragment identifier with each portion 52-1, 52-2 of the reference voice profile 52, namely:
- a first fragment identifier 54-1 is associated with the first portion 52-1 during a first operation phase, in order to uniquely identify the first portion 52-1 in a subsequent second phase in which the reconstruction of the reference voice profile 52 is performed starting from the portions thereof 52-1, 52-2;
- a second fragment identifier 54-2 is associated with the second portion 52-2 during the first operation phase, in order to uniquely identify the second portion 52-2 in the subsequent second phase of reconstructing the reference voice profile 52, as will be explained in more detail relatively to the description of FIG. 4B.

Finally, the processing unit executing the server component 30 runs an algorithm that calculates to distribute the two portions 52-1, 52-2 of the reference voice profile 52 in two distributed memories.

At the instant t104 (subsequent to t103) the transceiver of the server device (on which the server component 30 is run) transmits towards the smartphone 8 a subdivision notification message 201 carrying the first and second values of the fragment identifiers 54-1, 54-2.

The subdivision notification message 201 is received by the telecommunications network 10 and is routed (instant t105) towards the smartphone 8 via the message routers 23 and 21.

At the instant t106 (subsequent to t104) the transceiver of the smartphone 8 receives the subdivision notification message 201, then the processing unit of the smartphone 8 stores in the internal memory 8-1 the values of the fragment identifiers 54-1, 54-2.

At the instant t107 (subsequent to t103) the server device transceiver of the server component 30 transmits towards the telecommunications network 10 the first distribution message 105 carrying the values of the first portion 52-1 of the reference voice profile and the respective value of the first fragment identifier 54-1; further at the instant t120 (subsequent to t107) the server device transceiver of the server component 30 transmits towards the telecommunications network 10 the second distribution message 110 carrying the values of the second portion 52-2 of the reference voice profile and the respective value of the second fragment identifier 54-2.

It can be noted that at the instant t109 (subsequent to t107) the server component 30 performs the deletion of the first value of the fragment identifier 54-1 and the deletion of the first portion 52-1 of the reference voice profile 52, i.e. the server component 30 does not perform any local storage of the value of the first fragment identifier 54-1, or of the first portion 52-1 of the reference voice profile 52, i.e. said values are deleted by the server component 30 immediately after they have been transmitted towards the fragment storage node 40 through the telecommunications network 10.

Similarly, at the instant t121 (subsequent to t120) the server component 30 performs the deletion of the second value of the fragment identifier 54-2 and the deletion of the second portion 52-2 of the reference voice profile 52, i.e. the server component 30 does not perform any local storage of the value of the second fragment identifier 54-2, or of the second portion 52-2 of the reference voice profile 52, i.e. said values are deleted by the server component 30 immediately after they have been transmitted towards the fragment storage node 41 through the telecommunications network 10.

The operation after the instant t108 continues as previously illustrated after the instant t8 of FIG. 3A for the first phase of the first embodiment and the operation after the instant t121 continues as previously illustrated after the instant t21 of FIG. 3A for the first phase of the first embodiment.

It will be now described the operation of the electronic system 1 in the second operation phase in which the portions of the data associated with the subject 7 are recovered based on the second embodiment, also referring to FIGS. 2 and 4B.

The second embodiment of FIG. 4B differs from the first embodiment of FIG. 4A in that the reconstruction of the reference voice profile 52 is done in the server component 30, instead of in the smartphone 8.

Therefore at the instant t163 the server component 30 receives the message 157 carrying the first portion 52-1 of the reference voice profile and the first fragment identifier 54-1, and at the instant t182 the server component 30 receives the message 160 carrying the second portion 52-2 of the reference voice profile and the second fragment identifier 54-2; then the server component 30 performs the reconstruction of the reference voice profile 52 taking into consideration the first and second portions 52-1, 52-2.

At the instant t183 (subsequent to t182) the server component 30 transmits, towards the telecommunications network 10, a message 160 carrying the reconstructed reference voice profile.

The message 160 is forwarded by the server component 30 towards the smartphone 8 via the message routers 23 and 21.

At the instant t184 (subsequent to t183) the smartphone 8 receives the message 160 and extracts the reconstructed reference voice profile therefrom.

According to a variant of the first or second embodiment, it is used a threshold subdivision scheme, in which the number M of portions necessary to reconstruct the original data is less than the number N of portions into which the data has been subdivided:

For example, the threshold subdivision scheme is implemented using secret sharing techniques (see Wikipedia at the link https://en.wikipedia.org/wiki/Secret_sharing), such as the Adi Shamir or George Blakley's scheme.

For example, the data associated with a subject is subdivided into ten portions, which are stored in ten distributed memories as illustrated above (or in fifteen distributed memories using a redundancy of storage of five portions), in which six portions (threshold value) are sufficient to be able to correctly reconstruct the data associated with the subject. In this case, the server component 30 performs at the instant t82 a count of the number of different portions that have been correctly recovered from the shared memories and compares the value of the count with number six: when the value of the count is equal to six, the server component 30 sends a message towards the server component 30 to stop the recovery of the portions (or discards the incoming messages containing the portions beyond the sixth), as a sufficient number of portions from the data to be able to reconstruct it have been reached.

According to a variant of the first or second embodiment, the storage of at least a part of the portions of the data is dynamically changed over time at defined intervals (e.g., periodically) between at least a part of the memories associated with the fragment storage nodes, based on a defined storage rule, in order to further increase the security of the considered data.

For example, a rule may be to minimize the probability of storing, in the same memory associated with a fragment storage node, all the portions that are necessary to correctly reconstruct the data considered.

Considering, for example, the first data 52 subdivided into two portions 52-1, 52-2, the storage of the portion 52-1 of the first data 52 is dynamically changed over time at defined intervals (e.g., periodically) between at least a part of the memories 40-1, 40-2, 41-1, 41-2, 42-1 associated with the fragment storage node 40, 41, 42, such that the two portions 52-1, 52-2 are never simultaneously stored in the same memory selected from the memories 40-1, 40-2, 41-1, 41-2, 42-1, or such that the two portions are never stored in the two memories 40-1, 40-2 associated with the same fragment storage node 40 or in the two memories 41-1-, 41-2 associated with the same fragment storage node 41.

Some examples of storing the portions 52-1, 52-1 of the first data 52 are as follows:
  first portion 52-1 stored in the memory 40-1 associated with the fragment storage node 40 and second portion 52-2 stored in the memory 40-2 associated with the fragment storage node 40;
  first portion 52-1 stored in the memory 40-1 associated with the fragment storage node 40 and second portion 52-2 stored in the memory 41-1 associated with the fragment storage node 41;
  first portion 52-1 stored in the memory 40-2 associated with the fragment storage node 40 and second portion 52-2 stored in the memory 41-1 associated with the fragment storage node 41;
  first portion 52-1 stored in the memory 41-1 associated with the fragment storage node 41 and second portion 52-2 stored in the memory 41-2 associated with the fragment storage node 41;
  first portion 52-1 stored in the memory 40-1 associated with the fragment storage node 40 and second portion 52-2 stored in the memory 42-1 associated with the fragment storage node 42;
  first portion 52-1 stored in the memory 40-2 associated with the fragment storage node 40 and second portion 52-2 stored in the memory 42-1 associated with the fragment storage node 42;
  first portion 52-1 stored in the memory 41-1 associated with the fragment storage node 41 and second portion 52-2 stored in the memory 42-1 associated with the fragment storage node 42;
  first portion 52-1 stored in the memory 41-2 associated with the fragment storage node 41 and second portion 52-2 stored in the memory 42-1 associated with the fragment storage node 42.

In particular, the server component 30 has the function of activating and executing a defined storage update rule, in order to transfer at least a part of the portions of data from a memory (associated with a fragment storage node) to a memory associated with a different fragment storage node or to a different memory associated with the same fragment storage node.

The server component 30 is configured to identify which ones of the memories 40-1, 40-2, 41-1, 41-2, 42-1 (associated with the fragment storage nodes 40, 41, 42) are available to store one or more portions of data previously stored in other memories selected from the memories 40-1, 40-2, 41-1, 41-2, 42-1.

The server component 30 is thus configured to transmit a displacement request message indicative of a request for changing position of one or more portions of the data stored in the memories 40-1, 40-2, 41-1, 41-2, 42-1 identified as available.

The message routers 20, 21, 22, 23, 24, 25 are thus configured to receive from the server component 30 said message requesting to change position of one or more portions and forward said request message towards at least a part of the fragment storage nodes 40, 41, 42 associated with the memories 40-1, 40-2, 41-1, 41-2, 42-1.

At least part of the fragment storage nodes 40, 41, 42 are configured to receive (from the message routers 20, 21, 22, 23, 24, 25) the displacement request messages, are configured to read (from the respective memories associated therewith) the respective portions of the stored data and the corresponding values of the fragment identifiers and are further configured to transmit, towards a different fragment storage node selected from the fragment storage nodes 40, 41, 42 associated with the identified available memories 40-1, 40-2, 41-1, 41-2, 42-1, a portion displacement message carrying the portion of the data read in the memory associated with it and the corresponding value of the fragment identifier.

The message routers 20, 21, 22, 23, 24, 25 of the telecommunications network 10 are further configured to receive (from at least part of the fragment storage nodes 40, 41, 42) the portion displacement message carrying a portion of the data read from the memory associated therewith and the corresponding value of the fragment identifier, thus the message routers 20, 21, 22, 23, 24, 25 are configured to forward the portion displacement message towards one or more of the fragment storage nodes 40, 41, 42 associated with the identified available memories that are different from the memory associated with the fragment storage node that transmitted the portion of the read data from the memory.

Finally, the different fragment storage nodes 40, 41, 42 associated with the identified available memories have the further function of receiving the portion displacement message and of storing the received portion of the data in the identified available memory associated therewith.

The invention claimed is:

1. A method implemented by at least one computer to subdivide, distribute and store data associated with a subject in a plurality of distributed memories of a telecommunications network, comprising steps of:
   a) providing a telecommunications network comprising a plurality of network nodes with decentralized architecture;
   b) providing at least one server component connected to the telecommunications network;
   c) providing a plurality of fragment storage nodes connected to the telecommunications network, each fragment storage node comprising at least one respective non-volatile memory configured to store at least part of a plurality of portions of the data;
   d) storing, in a memory associated with an electronic device, a value of a user identifier to uniquely identify the subject and store at least one respective value of an entity identifier to identify a respective type of data associated with the subject;
   e) subdividing, at the electronic device, the data into a plurality of portions and associating, for each data portion, a respective fragment identifier to identify the respective data portion, thus generating a plurality of fragment identifiers;
   f) storing the plurality of fragment identifiers in the memory of the electronic device;
   g) transmitting, from the electronic device towards the telecommunications network, a storage request message carrying the plurality of data portions and the corresponding plurality of fragment identifiers;
   h) forwarding, by means of the telecommunications network, the storage request message towards at least one server component;
   i) receiving the storage request message by at least one server component and determining a number of a plurality of memories in which to store said plurality of data portions and the corresponding plurality of fragment identifiers;
   j) transmitting, from at least one server component towards the telecommunications network, a plurality of distribution messages, wherein each one of the distribution messages carries at least one data portion and the respective fragment identifier;
   k) receiving, by at least two fragment storage nodes, at least one distribution message;
   l) storing, for each storage node, at least one data portion and the respective fragment identifier in at least one memory associated with the storage node;
   m) identifying, by means of a server component, at least one available memory associated with a fragment storage node of the plurality of fragment storage nodes;
   n) transmitting, from the server component towards a plurality of message routers of the telecommunications network, a displacement request message indicative of a request for changing position, based on a defined rule, of at least one portion of data stored in a memory associated with a further fragment storage node of the plurality of fragment storage nodes, wherein the fragment storage node associated with the at least one identified available memory is different from said further fragment storage node associated with a read portion of the stored data;
   o) forwarding, by means of the plurality of message routers, the displacement request message towards said further fragment storage node;
   p) receiving, at said further fragment storage node, the displacement request message and reading, from at least one memory associated therewith, at least one portion of the stored data and at least one respective fragment identifier;
   q) transmitting, from said further fragment storage node towards the telecommunications network, a portion displacement message carrying at least one read portion of the stored data and at least one respective fragment identifier;
   r) forwarding, by means of the plurality of message routers of the telecommunications network, said portion displacement message towards a fragment storage node associated with at least one identified available memory;
   s) receiving, at the fragment storage node associated with the at least one identified available memory, said portion displacement message carrying the at least one read portion of the stored data and at least one respective fragment identifier and storing, in said at least one identified available memory, the at least one received portion of the data and the at least one respective received fragment identifier; and
   t) repeating steps m), n), o), p), q), r), s) at defined time intervals for further portions of the data, thereby moving further portions of the data from one or more memories associated with a fragment storage node to one or more available memories associated with other fragment storage nodes.

2. The method according to claim 1, wherein:
   in step c) each fragment storage node comprises at least two respective non-volatile memories configured to store at least two different data portions;
   step i) comprises determining, at the server component, to store at least two different data portions in at least two corresponding memories of a fragment storage node;
   step k) comprises receiving, at said fragment storage node, at least two distribution messages carrying the at least two different data portions and the respective at least two fragment identifiers;
   step l) comprises storing, in said fragment storage node, the at least two different data portions and the respective at least two fragment identifiers in at least two different memories associated with the storage node.

3. The method according to claim 2, further comprising, after step l), the steps of:
   m1) identifying, by means of a server component, at least one available memory associated with a fragment storage node of the plurality of fragment storage nodes;
   n1) transmitting, from the server component towards a plurality of message routers of the telecommunications network, a displacement request message indicative of a request for changing position, based on a defined rule, of at least one portion of data stored in a memory associated with a further fragment storage node of the plurality of fragment storage nodes, wherein the fragment storage node associated with the at least one identified available memory is different from said further fragment storage node associated with the read portion of the stored data;

o1) forwarding, by means of the plurality of message routers, the displacement request message towards said further fragment storage node;

p1) receiving, at said further fragment storage node, the displacement request message and reading, from at least one memory associated therewith, at least one portion of the stored data and at least one respective fragment identifier;

q1) transmitting, from said further fragment storage node towards the telecommunications network, a portion displacement message carrying at least one read portion of the stored data and at least one respective fragment identifier;

r1) forwarding, by means of the plurality of message routers of the telecommunications network, said portion displacement message towards a fragment storage node associated with at least one identified available memory;

s1) receiving, at the fragment storage node associated with the at least one identified available memory, said portion displacement message carrying the at least one read portion of the stored data and at least one respective fragment identifier and storing, in said at least one identified available memory, the at least one received portion of the data and the at least one respective received fragment identifier;

t1) repeating steps mm1), n1), o1), p1), q1), r1), s1) at defined time intervals, for further portions of the data, thereby moving further portions of the data from one or more memories associated with a fragment storage node to one or more available memories associated with other fragment storage nodes.

4. The method according to claim 3, wherein:

step i) comprises duplicating a first portion of the data and the corresponding fragment identifier, generating a copy of the first portion of the data and the corresponding fragment identifier;

step j) comprises transmitting a further distribution message carrying a copy of the first portion of the data and the respective fragment identifier;

steps k) and l) comprise receiving said further distribution message at a fragment storage node and storing the copy of the first portion of the data and the respective fragment identifier in a memory associated with the fragment storage node, wherein said copy of the first portion of the data and the respective fragment identifier are stored in a memory different from that in which the first portion of the data and the respective fragment identifier are stored.

5. The method according to claim 2, wherein:

step i) comprises duplicating a first portion of the data and the corresponding fragment identifier, generating a copy of the first portion of the data and the corresponding fragment identifier;

step j) comprises transmitting a further distribution message carrying a copy of the first portion of the data and the respective fragment identifier;

steps k) and l) comprise receiving said further distribution message at a fragment storage node and storing the copy of the first portion of the data and the respective fragment identifier in a memory associated with the fragment storage node, wherein said copy of the first portion of the data and the respective fragment identifier are stored in a memory different from that in which the first portion of the data and the respective fragment identifier are stored.

6. The method according to claim 2, wherein the telecommunications network comprises a plurality of message routers connected to each other with a mesh topology, wherein step h) comprises forwarding the storage request message from the electronic device to at least one server component, by means of at least part of the plurality of message routers, and wherein step j) comprises forwarding the plurality of distribution messages from at least one server component to at least part of the fragment storage nodes, by means of at least part of the plurality of message routers.

7. The method according to claim 1, wherein:

step i) comprises duplicating a first portion of the data and the corresponding fragment identifier, generating a copy of the first portion of the data and the corresponding fragment identifier;

step j) comprises transmitting a further distribution message carrying a copy of the first portion of the data and the respective fragment identifier;

steps k) and l) comprise receiving said further distribution message at a fragment storage node and storing the copy of the first portion of the data and the respective fragment identifier in a memory associated with the fragment storage node, wherein said copy of the first portion of the data and the respective fragment identifier are stored in a memory different from that in which the first portion of the data and the respective fragment identifier are stored.

8. The method according to claim 1, wherein:

step i) comprises duplicating a first portion of the data and the corresponding fragment identifier, generating a copy of the first portion of the data and the corresponding fragment identifier;

step j) comprises transmitting a further distribution message carrying a copy of the first portion of the data and the respective fragment identifier;

steps k) and l) comprise receiving said further distribution message at a fragment storage node and storing the copy of the first portion of the data and the respective fragment identifier in a memory associated with the fragment storage node, wherein said copy of the first portion of the data and the respective fragment identifier are stored in a memory different from that in which the first portion of the data and the respective fragment identifier are stored.

9. The method according to claim 1, wherein the telecommunications network comprises a plurality of message routers connected to each other with a mesh topology, wherein step h) comprises forwarding the storage request message from the electronic device to at least one server component, by means of at least part of the plurality of message routers, and wherein step j) comprises forwarding the plurality of distribution messages from at least one server component to at least part of the fragment storage nodes, by means of at least part of the plurality of message routers.

10. The method according to claim 1, wherein step j) further comprises, after the transmission of the plurality of distribution messages, the step of deleting the values of the plurality of portions of the data and of the corresponding plurality of fragment identifiers.

11. The method according to claim 1, comprising, after step l), the steps of:

m1) transmitting, from the electronic device towards the telecommunications network, a recovery request message carrying the plurality of the fragment identifiers;

n1) forwarding, by means of the telecommunications network, the recovery request message towards at least one server component;

o1) receiving the recovery request message by at least one server component and transmitting, towards the telecommunications network, at least one recovery request message;

p1) forwarding, by means of the telecommunications network, the recovery request message towards at least two fragment storage nodes;

q1) receiving the recovery request message by at least two fragment storage nodes;

r1) for each storage node, reading, from at least one memory, at least one data portion and the respective fragment identifier and transmitting, towards the telecommunications network, a message carrying the at least one data portion and the respective fragment identifier;

s1) forwarding, by means of the telecommunications network, said message towards at least one server component;

t1) receiving, at by at least one server component, a plurality of messages carrying at least one data portion and at least one respective fragment identifier;

u1) transmitting, from at least one server component towards the telecommunications network, a recovery confirmation message carrying the plurality of data portions and the corresponding plurality of fragment identifiers;

v1) forwarding, by means of the telecommunications network, the recovery confirmation message towards the electronic device;

z1) receiving, at the electronic device, the recovery confirmation message, extracting therefrom the plurality of data portions and the corresponding plurality of fragment identifiers, and reconstructing therefrom the data.

12. The method according to claim 11, wherein:

step e) comprises subdividing the data into a plurality N of portions using an information dispersal algorithm and secret sharing techniques, in particular Michael O. Rabin's algorithm;

step t1) comprises receiving, at the server component, a plurality of messages carrying a respective data portion and a corresponding fragment identifier;

step u1) comprises:

counting a number M of different received portions, wherein M is a positive integer value less than N;

comparing the value M with respect to a defined threshold value;

if the value M is less than the threshold value, continuing to transmit, towards the telecommunications network, the at least one recovery request message;

if the value M is equal to or greater than the threshold value, transmitting, towards the telecommunications network, a message indicating to stop the recovery of the data portions.

13. The method according to claim 1, wherein the method comprises, instead of steps e)-i), the steps of:

e1) transmitting, from the electronic device towards the telecommunications network, a storage request message carrying the data and the value of the corresponding entity identifier;

f1) forwarding, by means of the telecommunications network, the storage request message towards a server component;

g1) receiving the storage request message at the server component, subdividing the data into a plurality of portions and associating, for each data portion, a respective fragment identifier to identify the respective data portion, thus generating a plurality of fragment identifiers;

h1) determining, at the server component, a number of a plurality of memories in which to store said plurality of data portions and the corresponding plurality of fragment identifiers;

i1) transmitting, towards the telecommunications network, a subdivision notification message carrying the plurality of the fragment identifiers;

l1) forwarding, by means of the telecommunications network, the subdivision notification message towards the electronic device;

m1) receiving, at the electronic device, the subdivision notification message and storing, in the memory of the electronic device, the plurality of the fragment identifiers.

14. The method according to claim 13, comprising, instead of steps t), u), v), z), the steps:

t1) receiving, at the server component, a plurality of messages carrying at least one data portion and at least one respective fragment identifier, and extracting therefrom a plurality of data portions;

u1) reconstructing the data taking into consideration the plurality of extracted data portions;

v1) transmitting, from the server component towards the telecommunications network, a message carrying the reconstructed data;

z1) forwarding, by means of the telecommunications network, said message towards the electronic device and receiving said message at the electronic device.

15. A non-transitory computer-readable storage medium comprising instructions which, when executed by at least one computer, cause the at least one computer to carry out the steps of the method according to claim 1.

16. An electronic system for subdivision, distribution and storage of data associated with a subject in a plurality of distributed memories of a telecommunications network, the system comprising:

a telecommunications network comprising a plurality of network nodes with decentralized architecture, an electronic device connected to the telecommunications network, at least one server component connected to the telecommunications network, a plurality of fragment storage nodes connected to the telecommunications network;

wherein each fragment storage node comprises at least one respective non-volatile memory configured to store at least part of a plurality of portions of the data, wherein the electronic device comprises a memory configured to store:

a value of a user identifier to uniquely identify the subject and at least one respective value of an entity identifier to identify a respective type of data associated with the subject, a plurality of fragment identifiers, wherein each fragment identifier identifies a respective data portion;

wherein the electronic device is configured to:

subdivide the data into a plurality of portions and associate, for each data portion, a respective fragment identifier to identify the respective data portion, thus generating a plurality of fragment identifiers;
transmit, towards the telecommunications network, a storage request message carrying the plurality of data portions and the corresponding plurality of fragment identifiers;
wherein each server component is configured to:
receive, from the telecommunications network, the storage request message and determine a number of a plurality of memories in which to store said plurality of data portions and the corresponding plurality of fragment identifiers;
transmit, towards the telecommunications network, a plurality of distribution messages, wherein each of the distribution messages carries at least one data portion and the respective at least one fragment identifier;
wherein each fragment storage node is configured to:
receive at least one distribution message carrying at least one data portion and the respective at least one fragment identifier;
store, in the at least one memory associated therewith, the at least one data portion and the respective at least one fragment identifier;
wherein the electronic system is configured to:
a) identify, by means of the server component, at least one available memory associated with a fragment storage node of the plurality of fragment storage nodes;
b) transmit, from the server component towards a plurality of message routers of the telecommunications network, a displacement request message indicative of a request for changing position, based on a defined rule, of at least one portion of data stored in a memory associated with a further fragment storage node of the plurality of fragment storage nodes, wherein the fragment storage node associated with the at least one identified available memory is different from said further fragment storage node associated with a read portion of the stored data;
c) forward, by means of the plurality of message routers, the displacement request message towards said further fragment storage node;
d) receive, at said further fragment storage node, the displacement request message and reading, from at least one memory associated therewith, at least one portion of the stored data and at least one respective fragment identifier;
e) transmit, from said further fragment storage node towards the telecommunications network, a portion displacement message carrying at least one read portion of the stored data and at least one respective fragment identifier;
f) forward, by means of the plurality of message routers of the telecommunications network, said portion displacement message towards a fragment storage node associated with at least one identified available memory;
g) receive, at the fragment storage node associated with the at least one identified available memory, said portion displacement message carrying the at least one read portion of the stored data and at least one respective fragment identifier and storing, in said at least one identified available memory, the at least one received portion of the data and the at least one respective received fragment identifier; and
h) repeat a), b), c), d), e), f), g) at defined time intervals for further portions of the data, thereby moving further portions of the data from one or more memories associated with a fragment storage node to one or more available memories associated with other fragment storage nodes.

17. The electronic system according to claim 16, wherein the electronic device is further configured to:
transmit, towards the telecommunications network, a recovery request message carrying a plurality of the fragment identifiers;
receive, from the telecommunications network, a recovery confirmation message carrying the plurality of data portions and the corresponding plurality of fragment identifiers, extract therefrom the plurality of data portions and the corresponding plurality of fragment identifiers, and reconstruct therefrom the data;
wherein each server component is further configured to:
receive, from the telecommunications network, the recovery request message and transmit, towards the telecommunications network, at least one recovery request message;
receive, from the telecommunications network, a plurality of messages carrying at least one data portion and at least one respective fragment identifier;
transmit, towards the telecommunications network, the recovery confirmation message carrying the plurality of data portions and the corresponding plurality of fragment identifiers;
wherein each fragment storage node is configured to:
receive the recovery request message;
read, from at least one memory, at least one data portion and the respective fragment identifier and transmit, towards the telecommunications network, a message carrying the at least one data portion and the respective fragment identifier.

18. The electronic system according to claim 17, wherein the electronic device is further configured to:
transmit, towards the telecommunications network, a storage request message carrying the data and the value of the corresponding entity identifier;
receive, from the telecommunications network, a subdivision notification message carrying the plurality of the fragment identifiers;
wherein the server component is further configured to:
receive the storage request message, subdivide the data into a plurality of portions and associate, for each data portion, a respective fragment identifier to identify the respective data portion, thus generating a plurality of fragment identifiers;
determine a number of a plurality of memories in which to store said plurality of data portions and the corresponding plurality of fragment identifiers;
transmit, towards the telecommunications network, the subdivision notification message.

19. The electronic system according to claim 16, wherein the electronic device is further configured to:
transmit, towards the telecommunications network, a storage request message carrying the data and the value of the corresponding entity identifier;
receive, from the telecommunications network, a subdivision notification message carrying the plurality of the fragment identifiers;
wherein the server component is further configured to:
receive the storage request message, subdivide the data into a plurality of portions and associate, for each data portion, a respective fragment identifier to identify the respective data portion, thus generating a plurality of fragment identifiers;

determine a number of a plurality of memories in which to store said plurality of data portions and the corresponding plurality of fragment identifiers;

transmit, towards the telecommunications network, the subdivision notification message.

\* \* \* \* \*